(12) United States Patent
Sawada et al.

(10) Patent No.: US 10,030,763 B2
(45) Date of Patent: Jul. 24, 2018

(54) CONTROL APPARATUS FOR VEHICLE

(71) Applicant: TOYOTA JIDOSHA KABUSHIKI KAISHA, Toyota-shi, Aichi-ken (JP)

(72) Inventors: Hiroyuki Sawada, Okazaki (JP); Takahiro Kondo, Toyota (JP); Yoshiki Ando, Oobu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/485,300

(22) Filed: Apr. 12, 2017

(65) Prior Publication Data

US 2017/0299051 A1 Oct. 19, 2017

(30) Foreign Application Priority Data

Apr. 15, 2016 (JP) ................... 2016-082504

(51) Int. Cl.
  *F16H 61/02* (2006.01)
  *F16H 59/18* (2006.01)
  (Continued)

(52) U.S. Cl.
  CPC ......... *F16H 61/0204* (2013.01); *F16H 3/663* (2013.01); *F16H 59/18* (2013.01); *F16H 2200/006* (2013.01); *F16H 2200/201* (2013.01); *F16H 2200/2046* (2013.01); *F16H 2200/2066* (2013.01); *F16H 2200/2082* (2013.01)

(58) Field of Classification Search
  CPC ...... F16H 61/0204; F16H 59/18; F16H 3/663; F16H 2200/006; F16H 2200/201; F16H 2200/2046; F16H 2200/2066; F16H 2200/2082; F16H 2306/14; F16H 2061/2846
  See application file for complete search history.

(56) References Cited

U.S. PATENT DOCUMENTS 4,635,508 A * 1/1987 Tatsumi ................ F16H 59/24
  477/125
5,478,293 A * 12/1995 Yonezawa ............ B60W 10/06
  477/107

(Continued)

FOREIGN PATENT DOCUMENTS

JP H07-119814 A 5/1995
JP 2016-011729 A 1/2016

*Primary Examiner* — Jacob S Scott
*Assistant Examiner* — Tinh Dang
(74) *Attorney, Agent, or Firm* — Oliff PLC

(57) ABSTRACT

In a control apparatus for a vehicle, when it is not determined that a downshift to a second gear stage should be carried out and an accelerator depression amount change rate is equal to or smaller than a predetermined value when it is determined that a downshift to a first gear stage should be carried out, a single downshift command to the first gear stage is output. When it is not determined that the downshift to the second gear stage should be carried out and the accelerator depression amount change rate is larger than the predetermined value when it is determined that the downshift to the first gear stage should be carried out, a current gear stage is maintained. Therefore, a skip downshift to the second gear stage can be carried out when it is determined that the downshift to the second gear stage should be carried out.

6 Claims, 5 Drawing Sheets

(51) Int. Cl.
*F16H 61/28* (2006.01)
*F16H 3/66* (2006.01)

(56) References Cited

U.S. PATENT DOCUMENTS

| | | | | |
|---|---|---|---|---|
| 5,624,351 | A | 4/1997 | Fujita et al. | |
| 7,610,137 | B2 * | 10/2009 | Kwon | F16H 61/0213 475/116 |
| 2005/0137771 | A1 * | 6/2005 | Kwon | F16H 61/0213 701/51 |
| 2007/0259755 | A1 * | 11/2007 | Tanishima | B60K 6/387 477/3 |
| 2011/0093173 | A1 * | 4/2011 | Ideshio | F16H 61/0213 701/55 |
| 2015/0184742 | A1 * | 7/2015 | Inagawa | F16H 61/10 701/55 |
| 2015/0377349 | A1 | 12/2015 | Kosaka et al. | |

\* cited by examiner

FIG. 3

|     | C1 | C2 | C3 | C4 | B1 | B2 | F1 |
|-----|----|----|----|----|----|----|----|
| P   |    |    |    |    |    |    |    |
| Rev |    |    | ○  |    |    | ○  |    |
| N   |    |    |    |    |    |    |    |
| 1st | ○  |    |    |    |    | ◎  | ○  |
| 2nd | ○  |    |    |    | ○  |    |    |
| 3rd | ○  |    | ○  |    |    |    |    |
| 4th | ○  |    |    | ○  |    |    |    |
| 5th | ○  | ○  |    |    |    |    |    |
| 6th |    | ○  |    | ○  |    |    |    |
| 7th |    | ○  | ○  |    |    |    |    |
| 8th |    | ○  |    |    | ○  |    |    |

○ : ENGAGED   ◎ : ENGAGED WHEN ENGINE IS DRIVEN

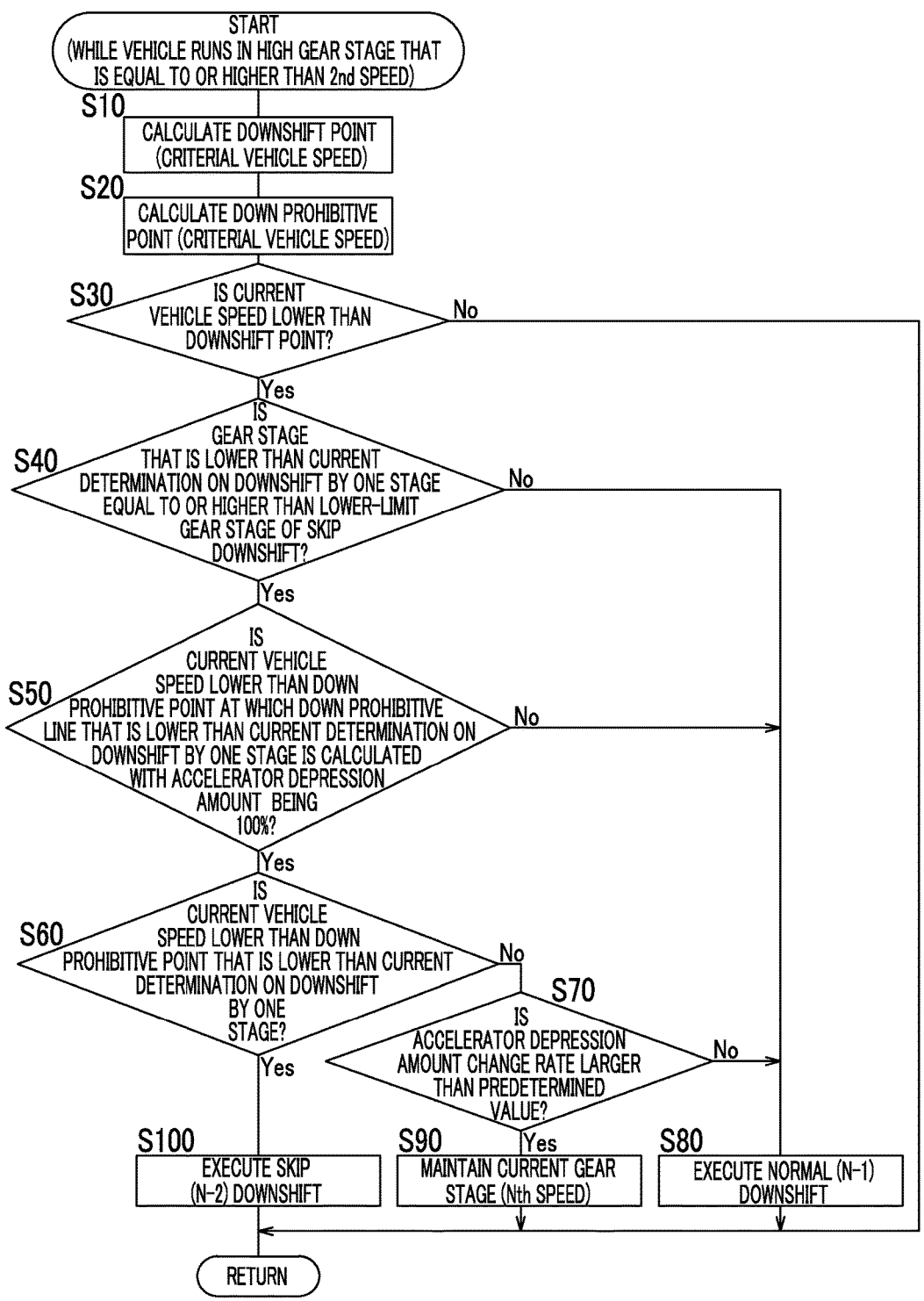

CONTROL APPARATUS FOR VEHICLE

INCORPORATION BY REFERENCE

The disclosure of Japanese Patent Application No. 2016-082504 filed on Apr. 15, 2016 including the specification, drawings and abstract is incorporated herein by reference in its entirety.

BACKGROUND

1. Technical Field

The present disclosure relates to a control apparatus for a vehicle that is equipped with an automatic transmission in which a plurality of gear stages having different gear ratios are selectively formed.

2. Description of Related Art

A control apparatus for a vehicle that is equipped with an automatic transmission in which a plurality of gear stages having different gear ratios are selectively formed is well known. For instance, a shift control apparatus for an automatic transmission described in Japanese Patent Application Publication No. 7-119814 (JP 7-119814 A) is such an example. This Japanese Patent Application Publication No. 7-119814 (JP 7-119814 A) discloses the following. In shift control of an automatic transmission, a downshift command from a fourth-speed stage to a third-speed stage is output when a throttle valve opening degree crosses a 4→3 shift line. After that, when it is determined that the change rate of the throttle valve opening degree is larger than a threshold, it is predicted that the throttle valve opening degree crosses a 3→2 shift line (i.e., there is a request for a downshift to a second-speed stage), the already output downshift command from the fourth-speed stage to the third-speed stage is stopped, and a downshift command from the fourth-speed stage to the second-speed stage is output. On the other hand, if it is determined that the change rate of the throttle valve opening degree is equal to or smaller than the threshold, downshift control from the fourth-speed stage to the third-speed stage continues to be performed.

SUMMARY

By the way, oil pressure control for shifting is started through the outputting of a downshift command. However, it takes time until the shifting is actually started, due to a change in rotation of an input shaft of an automatic transmission resulting from shifting. According to the art of the foregoing Japanese Patent Application Publication No. 7-119814 (JP 7-119814 A), when it is predicted that there is a request for a downshift (i.e., a skip downshift) from a current gear stage (which is also synonymous with a current shift stage) to a gear stage that is lower in vehicle speed than the current gear stage by two or more stages before a downshift (i.e., a single downshift) from the current gear stage to a gear stage that is lower in vehicle speed than the current gear stage by one stage is actually started, the single downshift is canceled, and a changeover to the skip downshift is newly made. Therefore, if a subsequent single downshift (e.g., a 3→2 downshift) is requested at a timing when a single downshift (e.g., a 4→3 downshift) whose downshift command is output cannot be canceled, the subsequent single downshift is carried out after the completion of the actually started single downshift. Then, a driver may develop a feeling of busy shift due to the succession of the single downshifts in two stages.

The present disclosure has been made in view of the foregoing circumstances. The present disclosure provides a control apparatus for a vehicle that can restrain a feeling of busy shift from being caused due to the succession of downshifts in two stages.

Thus, according to one aspect of the present disclosure, there is provided a control apparatus for a vehicle that is equipped with an automatic transmission in which a plurality of gear stages having different gear ratios are selectively provided. The control apparatus includes an electronic control unit. The electronic control unit is configured to: (i) determine whether or not a change rate of an accelerator depression amount of the vehicle is larger than a predetermined value, (ii) output a command to execute a downshift from a current gear stage to a first gear stage when a condition of a downshift to a second gear stage is not fulfilled, the second gear stage being lower in vehicle speed than the first gear stage, and when the electronic control unit determines that the change rate of the accelerator depression amount is equal to or smaller than the predetermined value when a condition of the downshift to the first gear stage is fulfilled, the first gear stage being lower in vehicle speed than the current gear stage, and (iii) maintain the current gear stage when the condition of the downshift to the second gear stage is not fulfilled and when the electronic control unit determines that the change rate of the accelerator depression amount is larger than the predetermined value.

As described above, according to the control apparatus for a vehicle, when the condition of the downshift to the second gear stage is not fulfilled and the change rate of the accelerator depression amount is equal to or smaller than the predetermined value when the condition of the downshift to the first gear stage is fulfilled, a command to execute the downshift from the current gear stage to the first gear stage is output. Therefore, in the case where the possibility of fulfillment of the condition of the downshift to the second gear stage is low, the downshift to the first gear stage is swiftly carried out. On the other hand, when the condition of the downshift to the second gear stage is not fulfilled and the change rate of the accelerator depression amount is larger than the predetermined value when the condition of the downshift to the first gear stage is fulfilled, the current gear stage is maintained. Therefore, in the case where the possibility of fulfillment of the condition of the downshift to the second gear stage is high, when the condition of the downshift to the second gear stage is fulfilled, the downshift to the first gear stage is not carried out, and the downshift from the current gear stage to the second gear stage can be carried out. In consequence, a feeling of busy shift can be restrained from being caused due to the succession of downshifts in two stages.

Additionally, in the above control apparatus for a vehicle, when the current gear stage is maintained, the electronic control unit may be configured to: (i) output a command to execute the downshift from the current gear stage to the first gear stage when the electronic control unit determines that the change rate of the accelerator depression amount is equal to or smaller than the predetermined value, and (ii) output a command to execute the downshift from the current gear stage to the second gear stage when the condition of the downshift to the second gear stage is fulfilled.

As described above, according to the control apparatus for a vehicle, when the change rate of the accelerator depression amount is equal to or smaller than the predetermined value when the current gear stage is maintained, a command to execute the downshift to the first gear stage is output. On the other hand, when the condition of the downshift to the second gear stage is fulfilled, a command to execute the downshift to the second gear stage is output. Therefore, better drivability results from slightly delaying the downshift to the first gear stage to maintain the current gear stage and then outputting the downshift to the first gear stage or comprehensively outputting the downshift to the second gear stage.

Additionally, in the above control apparatus for a vehicle, the electronic control unit may be configured to output a command to execute the downshift from the current gear stage to the second gear stage when the condition of the downshift to the second gear stage is further fulfilled when the condition of the downshift to the first gear stage is fulfilled.

As described above, according to the control apparatus for a vehicle, when the condition of the downshift to the second gear stage is further fulfilled when the condition of the downshift to the first gear stage is fulfilled, a command to execute the downshift to the second gear stage is output. Therefore, the downshift to the second gear stage is carried out from the current gear stage without the intermediary of the first gear stage.

Additionally, in the above control apparatus for a vehicle, the electronic control unit may be configured to output a command to execute the downshift from the current gear stage to the first gear stage in a case where the condition of the downshift to the second gear stage cannot be fulfilled even though the accelerator depression amount is maximized when the condition of the downshift to the first gear stage is fulfilled.

As described above, according to the control apparatus for a vehicle, when the condition of the downshift to the second gear stage cannot be fulfilled even though the accelerator depression amount is maximized when the condition of the downshift to the first gear stage is fulfilled, a command to execute the downshift to the first gear stage is output. Therefore, when the condition of the downshift to the second gear stage cannot be fulfilled even when the downshift to the first gear stage is delayed, the downshift to the first gear stage is swiftly carried out.

Additionally, in the above control apparatus for a vehicle, the electronic control unit may be configured to output a command to execute the downshift from the current gear stage to the first gear stage when the second gear stage is a gear stage that is not permitted as a downshift destination from the current gear stage when the condition of the downshift to the first gear stage is fulfilled.

As described above, according to the control apparatus for a vehicle, when the second gear stage is a gear stage that is not permitted as a downshift destination from the current gear stage when the condition of the downshift to the first gear stage is fulfilled, a command to execute the downshift to the first gear stage is output. Therefore, when the downshift to the second gear stage cannot be carried out even when the downshift to the first gear stage is delayed, the downshift to the first gear stage is swiftly carried out.

Additionally, in the above control apparatus for a vehicle, when the accelerator depression amount is increased, the electronic control unit may be configured to: (i) determine whether or not the condition of the downshift to the first gear stage is fulfilled, by using a first relationship determined in advance for each interval between the plurality of the gear stages which are different from each other by one stage, and (ii) determine whether or not the condition of the downshift to the second gear stage is fulfilled, by using a second relationship determined in advance such that the condition of the downshift is more likely to be fulfilled than in the first relationship.

As described above, according to the control apparatus for a vehicle, when the accelerator depression amount is increased, it is determined whether or not the condition of the downshift to the first gear stage is fulfilled, using the first relationship, and it is determined whether or not the condition of the downshift to the second gear stage is fulfilled, using the second relationship in which the condition of the downshift is more likely to be fulfilled than in the first relationship. Therefore, when the accelerator depression amount is increased, the downshift to the second gear stage is likely to be carried out from the current gear stage without the intermediary of the first gear stage.

BRIEF DESCRIPTION OF THE DRAWINGS

Features, advantages, and technical and industrial significance of an exemplary embodiment of the present disclosure will be described below with reference to the accompanying drawings, in which like numerals denote like elements, and wherein:

FIG. 3 is an operation chart illustrating a relationship between a shift operation of the automatic transmission and a combination of operations of engagement devices that are employed for the shift operation;

FIG. 5 is a flowchart illustrating the essential part of a control operation of an electronic control unit, namely, a control operation for restraining a feeling of busy shift from being caused due to the succession of downshifts in two stages.

DETAILED DESCRIPTION OF EMBODIMENT

The embodiment of the present disclosure will be described hereinafter in detail with reference to the drawings.

Figure 1:
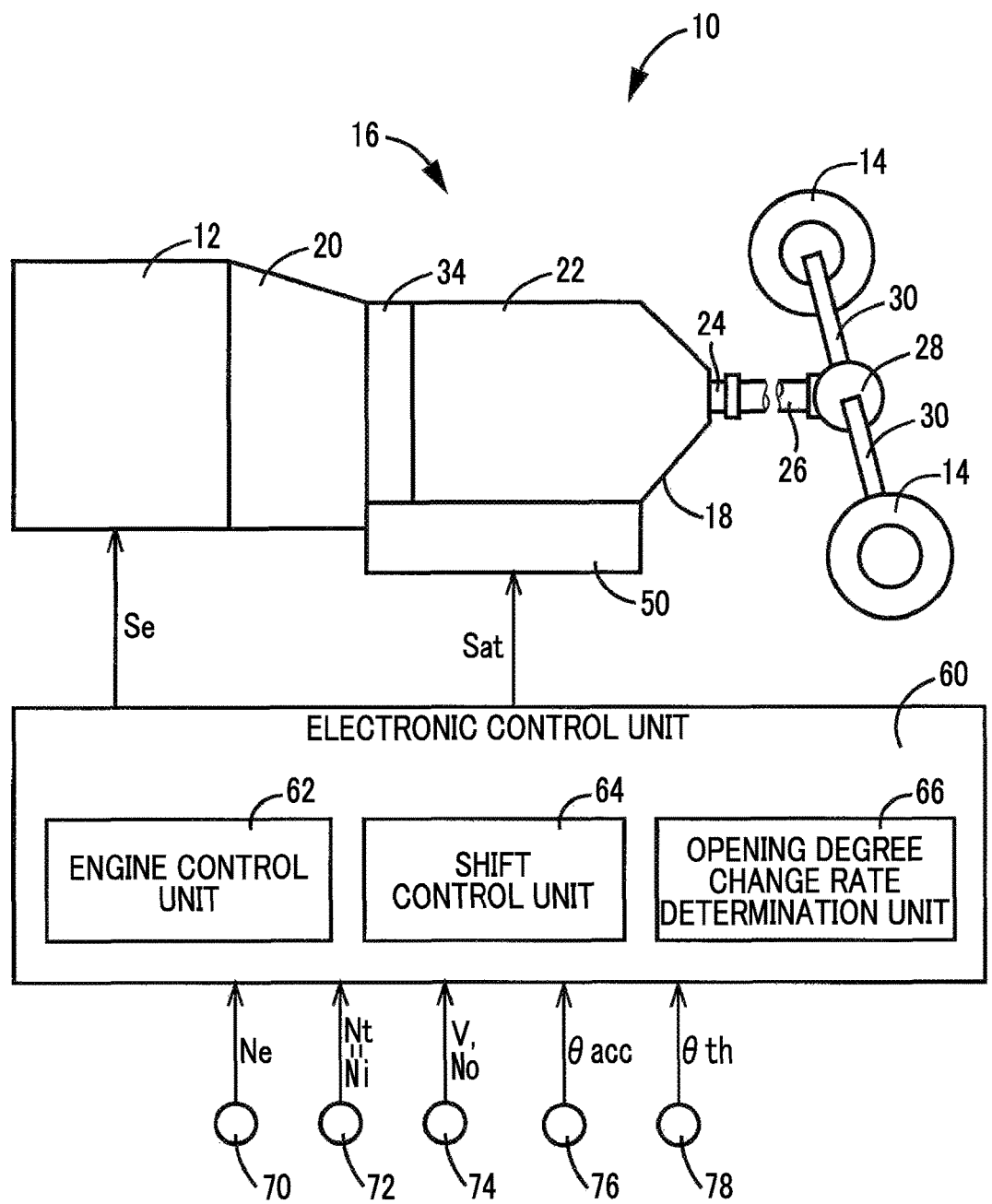
FIG. 1 is a view illustrating the general configuration of a vehicle to which the present disclosure is applied, and is a view illustrating the essential part of control functions and a control system for various kinds of control in the vehicle.

FIG. 1 is a view illustrating the general configuration of a vehicle 10 to which the present disclosure is applied, and is a view illustrating the essential part of a control system for various kinds of control in the vehicle 10. In FIG. 1, the vehicle 10 is equipped with an engine 12, driving wheels 14, and a vehicular motive power transmission device 16 (hereinafter referred to as the motive power transmission device 16) that is provided in a motive power transmission path between the engine 12 and the driving wheels 14. The motive power transmission device 16 is equipped with a torque converter 20 and an automatic transmission 22 that are disposed in a case 18 as a non-rotary member that is attached to a vehicle body, a propeller shaft 26 that is coupled to a transmission output shaft 24 as an output rotary member of the automatic transmission 22, a differential gear device (a differential gear) 28 that is coupled to the propeller shaft 26, a pair of axles 30 that are coupled to the differential gear device 28, and the like. In the motive power transmission device 16, a motive power (which is also synonymous with a torque or a force when no distinction is made therebetween) that is output from the engine 12 is transmitted to the driving wheels 14 sequentially via the torque converter 20, the automatic transmission 22, the propeller shaft 26, the differential gear device 28, the axles 30 and the like.

The engine 12 is a driving force source of the vehicle 10, and is a known internal combustion engine such as a gasoline engine, a diesel engine or the like. Operating states of this engine 12 such as an intake air amount, a fuel supply amount, an ignition timing and the like are controlled by an electronic control unit 60 that will be described later. Thus, an engine torque Te of the engine 12 is controlled.

Figure 2:
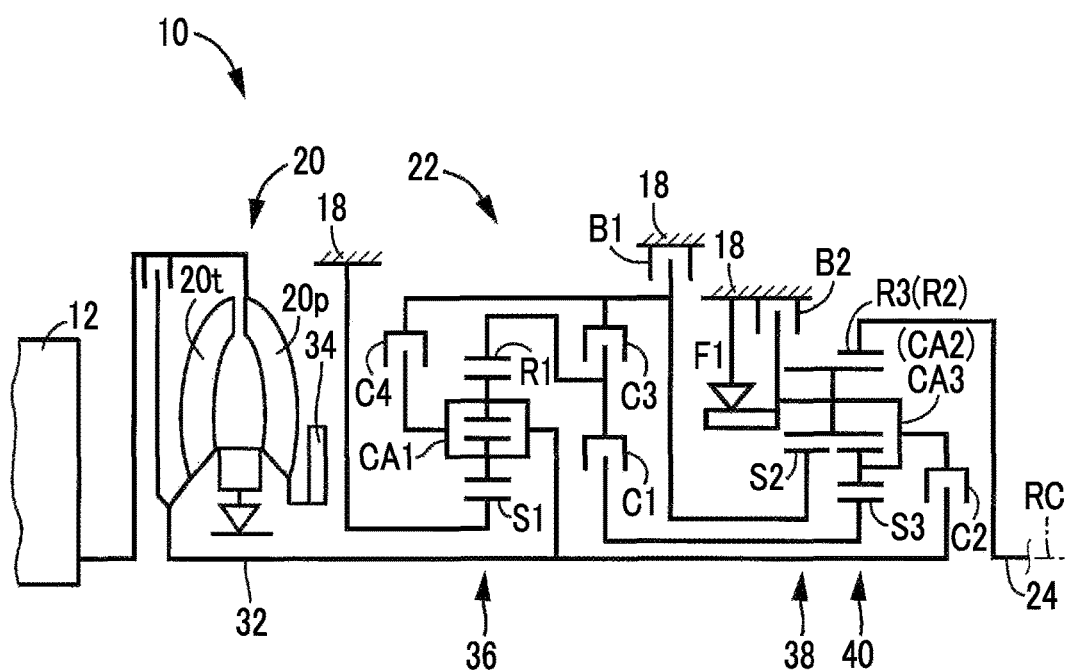
FIG. 2 is a skeleton diagram illustrating an exemplary torque converter and an exemplary automatic transmission.

FIG. 2 is a skeleton diagram illustrating examples of the torque converter 20 and the automatic transmission 22. Incidentally, the torque converter 20, the automatic transmission 22 and the like are substantially symmetrically configured with respect to an axial center RC of a transmission input shaft 32 as an input rotary member of the automatic transmission 22. The lower half below the axial center RC is omitted in FIG. 2.

In FIG. 2, the torque converter 20 is disposed in such a manner as to rotate around the axial center RC. The torque converter 20 is a hydraulic transmission device that is equipped with a pump impeller 20p that is coupled to the engine 12, and a turbine impeller 20t that is coupled to the transmission input shaft 32. Besides, the motive power transmission device 16 is equipped with a mechanical oil pump 34 that is coupled to the pump impeller 20p (see FIG. 1). By being rotationally driven by the engine 12, the oil pump 34 generates (discharges) a hydraulic oil pressure for performing shift control of the automatic transmission 22 and supplying lubricating oil to respective portions of the motive power transmission path of the motive power transmission device 16.

The automatic transmission 22 is a stepped automatic transmission that constitutes part of the motive power transmission path between the engine 12 and the driving wheels 14. The automatic transmission 22 has a plurality of sets of planetary gear devices and a plurality of engagement devices. The automatic transmission 22 is a planetary gear-type multistage transmission in which a plurality of gear stages (shift stages) having different gear ratios (speed ratios) γ (=an AT input rotational speed Ni/an AT output rotational speed No) are selectively formed through the engagement of a predetermined one or predetermined ones of the plurality of the engagement devices. The automatic transmission 22 is a stepped transmission that carries out so-called clutch-to-clutch shifting, which is often used in a known vehicle. Incidentally, the AT input rotational speed Ni is a rotational speed of the transmission input shaft 32, and the AT output rotational speed No is a rotational speed of the transmission output shaft 24.

The automatic transmission 22 has a double pinion-type first planetary gear device 36, a single pinion-type second planetary gear device 38 and a double pinion-type third planetary gear device 40, which are located on the same axis (on the axial center RC). The second planetary gear device 38 and the third planetary gear device 40 are configured as Ravigneaux-type planetary gear devices. The automatic transmission 22 changes the speed of rotation of the transmission input shaft 32, and then outputs this rotation from the transmission output shaft 24. In the automatic transmission 22, some of respective rotary elements (sun gears S1, S2 and S3, carriers CA1, CA2 and CA3, and ring gears R1, R2 and R3) of the first planetary gear device 36, the second planetary gear device 38 and the third planetary gear device 40 are coupled to one another or coupled to the transmission input shaft 32, the case 18 or the transmission output shaft 24 directly or indirectly (or selectively) via the engagement devices.

The plurality of the engagement devices are frictional engagement devices and a one-way clutch F1. The aforementioned frictional engagement devices are clutches C1, C2, C3 and C4 and brakes B1 and B2 (which will be referred to hereinafter simply as engagement devices C when no distinction is made in particular among them). The engagement devices C are hydraulic frictional engagement devices that are constituted of wet multiple plate-type clutches and brakes that are pressed by hydraulic actuators respectively, band brakes that are tightened by hydraulic actuators respectively, and the like. The torque capacity (i.e., the clutch torque) of each of the engagement devices C is changed by an oil pressure that is output from a solenoid valve or the like in an oil pressure control circuit 50 (see FIG. 1) with which the motive power transmission device 16 is equipped. Thus, each of the engagement devices C is changed over between engagement and release.

The electronic control unit 60, which will be described later, controls the engagement and release of the engagement devices C. Thus, as indicated by an engagement operation chart of FIG. 3, respective gear stages, that is, eight forward stages and one backward stage are formed in the automatic transmission 22 in accordance with a driver's operation of an accelerator, a vehicle speed V and the like. In FIG. 3, "1st" to "8th" mean first-speed to eighth-speed gear stages as forward gear stages, "Rev" means a backward gear stage, "N" means a neutral state where none of the gear stages is formed, and "P" means a neutral state where the transmission output shaft 24 is mechanically prevented from rotating (the rotation of the transmission output shaft 24 is locked). The gear ratio γ of the automatic transmission 22, which corresponds to each of the gear stages, is appropriately determined by respective gear ratios (the number of teeth of the sun gear/the number of teeth of the ring gear) ρ1, ρ2 and ρ3 of the first planetary gear device 36, the second planetary gear device 38 and the third planetary gear device 40.

The engagement operation chart of FIG. 3 summarizes a relationship between the respective gear stages and the respective operation states of the plurality of the engagement devices. Each circle represents engagement, a double circle represents engagement at the time when the engine is driven (at the time of engine brake), and each blank represents release. In the automatic transmission 22, the one-way clutch F1 that prevents reverse rotation of the carrier CA2 and the carrier CA3 while permitting positive rotation thereof (in the same rotational direction as the transmission input shaft 32) is provided in parallel with the brake B2, between the carriers CA2 and CA3, which are integrally coupled to each other, and the case 18. Accordingly, at the time of driving when the driving wheel 14 sides are rotationally driven from the engine 12 side, the first-speed gear stage "1st" is formed through automatic engagement of the one-way clutch F1, simply by engaging the clutch C1 without the need to engage the brake B2.

Returning to FIG. 1, the vehicle 10 is equipped with the electronic control unit 60 including control units of the vehicle 10 that are associated with, for example, shift control of the automatic transmission 22 and the like. In consequence, FIG. 1 is a view showing an input/output system of the electronic control unit 60, and is a functional block diagram illustrating the essential part of control functions performed by the electronic control unit 60. The electronic control unit 60 is configured to include a so-called microcomputer that is equipped with, for example, a CPU, a RAM, a ROM, input/output interfaces and the like. The CPU performs various kinds of control of the vehicle 10 by carrying out a signal processing according to a program stored in advance in the ROM while utilizing a temporary storage function of the RAM. For example, the electronic control unit 60 performs output control of the engine 12, shift control of the automatic transmission 22 and the like. The electronic control unit 60 is configured separately as an electronic control unit for engine output control and an electronic control unit for oil pressure control (for shift control), and the like as necessary.

Various actual values (e.g., the engine rotational speed Ne, the AT input rotational speed Ni as a turbine rotational speed Nt, the AT output rotational speed No corresponding to the vehicle speed V, an accelerator depression amount θacc as an operation amount of an accelerator pedal, a throttle valve opening degree θth as an opening degree of an electronic throttle valve and the like) based on detection signals detected by various sensors with which the vehicle 10 is equipped (e.g., an engine rotational speed sensor 70, an input rotational speed sensor 72, an output rotational speed sensor 74, an accelerator depression amount sensor 76, a throttle valve opening degree sensor 78 and the like) are each supplied to the electronic control unit 60. Besides, an engine output control command signal Se for output control of the engine 12, an oil pressure control command signal Sat for oil pressure control regarding the shifting of the automatic transmission 22, and the like are each output from the electronic control unit 60. This oil pressure control command signal Sat is a command signal (an oil pressure command value) for driving respective solenoid valves that adjust respective oil pressures that are supplied to the respective hydraulic actuators of the engagement devices C, and is output to the oil pressure control circuit 50.

In order to realize control functions for various kinds of control in the vehicle 10, the electronic control unit 60 is equipped with engine control means, namely, an engine control unit 62 and shift control means, namely, a shift control unit 64.

The engine control unit 62 calculates a required driving force Fdem by applying the accelerator depression amount θacc and the vehicle speed V (which is also synonymous with the AT output rotational speed No and the like) to a relationship (e.g., a driving force map) obtained in advance experimentally or through designing and stored (i.e., determined in advance). The engine control unit 62 sets a target engine torque Tetgt at which the required driving force Fdem is obtained in consideration of a transmission loss, an auxiliary load, the gear ratio γ of the automatic transmission 22 and the like, and outputs the engine output control command signal Se for performing output control of the engine 12 to a throttle actuator, a fuel injection device, an ignition device and the like such that the target engine torque Tetgt is obtained.

The shift control unit 64 determines whether to execute the shifting of the automatic transmission 22 or not, by making a determination on the presence or absence of the performance of changeover control of the gear stages of the automatic transmission 22 using a relationship determined in advance (a shift map or a shift diagram). The shift control unit 64 determines whether to execute the shifting of the automatic transmission 22 or not (i.e., makes a determination on a gear stage to be formed in the automatic transmission 22) by applying a vehicle speed-associated value and a required driving amount to the aforementioned shift map. The shift control unit 64 outputs the oil pressure control command signal Sat for engaging and/or releasing the engagement devices C regarding the shifting of the automatic transmission 22 to the oil pressure control circuit 50, in such a manner as to form the determined gear stage. The aforementioned vehicle speed-associated value is the vehicle speed V or a value associated with the vehicle speed V, for example, the vehicle speed V, a wheel speed, the AT output rotational speed No or the like. The aforementioned required driving amount is a value representing the magnitude of the driving required of the vehicle 10 by the driver, for example, the above-mentioned required driving force Fdem (N), a required driving torque (Nm) associated with the required driving force Fdem, a required driving power (W) or the like. The accelerator depression amount θacc (%), a throttle valve opening degree θth (%), an intake air amount (g/sec) or the like can also be simply used as this required driving amount.

Figure 4:
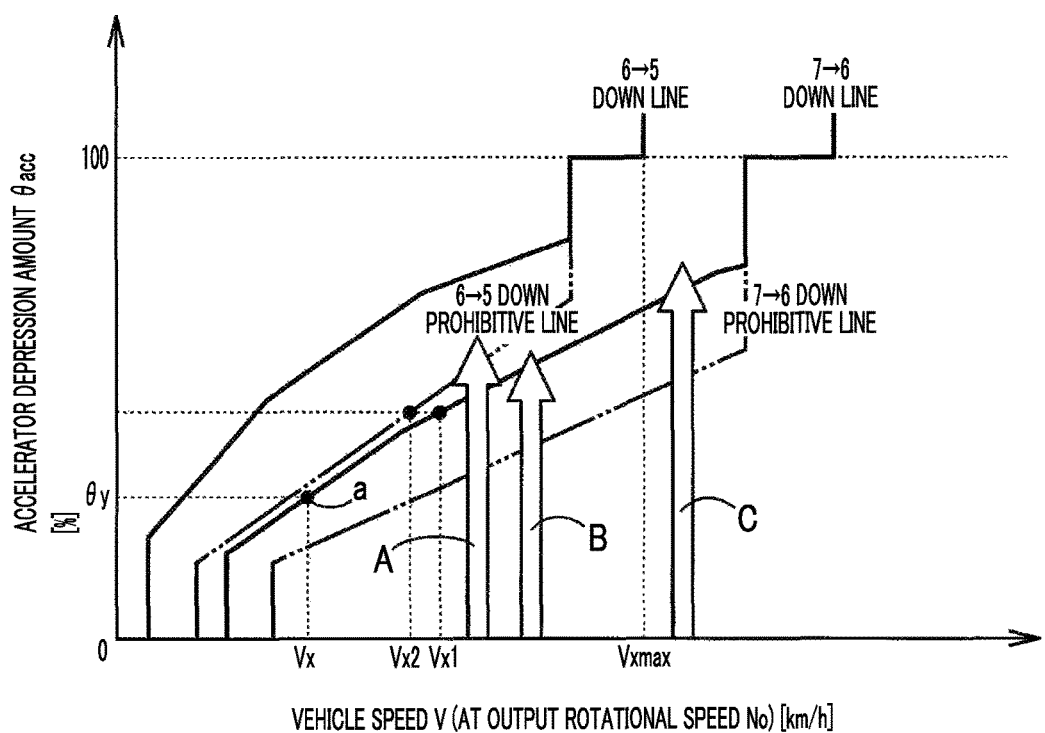
FIG. 4 is a view exemplifying part of a shift map.

As shown in, for example, FIG. 4, the aforementioned shift map is a predetermined relationship having shift lines for making a determination on the shifting of the automatic transmission 22 on a two-dimensional coordinate plane using the vehicle speed V (the AT output rotational speed No) and the accelerator depression amount θacc as variables. The respective shift lines in this shift map are up lines for making a determination on an upshift, and down lines for making a determination on a downshift. Each of the up lines and the down lines is determined in advance for each interval between those of the plurality of the gear stages which are different from each other by one stage. As indicated by solid lines, FIG. 4 exemplifies a 6→5 down line for making a determination on a downshift from the sixth-speed gear stage to the fifth-speed gear stage (which will be referred to as a 6→5 downshift), and a 7→6 down line for making a determination on a 7→6 downshift.

Each of these shift lines is designed to determine whether or not the actual vehicle speed V has crossed a line indicating the certain accelerator depression amount θacc, or whether or not the actual accelerator depression amount θacc has crossed a line indicating the certain vehicle speed V, namely, whether or not a value at which shifting should be carried out on the shift line (a shift point) has been passed. Each of the shift lines is determined in advance as a series of such shift points. Accordingly, as indicated by, for example, a point a in FIG. 4, when the gear stage at the moment (hereinafter referred to as the current gear stage) is the seventh-speed gear stage, the downshift point coincides with a criterial vehicle speed Vx in the case where the accelerator depression amount θacc is equal to θy (%). Then, when the vehicle speed at the moment (hereinafter referred to as the current vehicle speed) is higher than the downshift point (the criterial vehicle speed Vx), a condition of the 7→6 downshift is not fulfilled (i.e., it is not determined that the 7→6 downshift should be carried out). On the other hand, when the current vehicle speed V is lower than the downshift point, the condition of the 7→6 downshift is fulfilled (i.e., it is determined that the 7→6 downshift should be carried out). Alternatively, when the current gear stage is the seventh-speed gear stage, the downshift point is a criterial opening degree θy in the case where the vehicle speed V is equal to Vx (km/h). Then, when the accelerator depression amount at the moment (hereinafter referred to as the current accelerator depression amount) θacc is smaller than the downshift point (the criterial opening degree θy), it is not determined that the 7→6 downshift should be carried out. On the other hand, when the current accelerator depression amount θacc is larger than the downshift point, it is determined that the 7→6 downshift should be carried out. Determining whether or not the value at which the shifting should be carried out (the shift point) on the shift line has been passed using the shift map (the shift lines) is determining whether or not the condition of a shift (a downshift or an upshift) to a certain one of the gear stages of the automatic transmission 22 is fulfilled using the shift map (the shift lines). When the condition of the shift to the certain one of the gear stages is fulfilled, it is determined that the shift to the certain one of the gear stages should be carried out. When the condition of the shift to the certain one of the gear stages is not fulfilled, it is not determined that the shift to the certain one of the gear stages should be carried out.

It should be noted herein that when the accelerator depression amount θacc is increased by depressing the accelerator pedal or increasing the amount of depression thereof, it is determined early that the downshift should be carried out, and the automatic transmission 22 is downshifted early. Therefore, the shift map has, in addition to the normal down lines, down prohibitive lines determined in advance such that it is more likely to be determined that a downshift should be carried out than on the down lines. Each of these down prohibitive lines is set from the standpoint of, for example, making it more likely to determine that a downshift should be carried out than on the original down line but ensuring a hysteresis from the up line not to make it any more likely to determine that a downshift should be carried out (i.e., prohibiting determining that a downshift should be carried out earlier than at this timing), with a view to preventing the occurrence of shift hunting such as an upshift immediately after a downshift. In FIG. 4, a 6→5 down prohibitive line and a 7→6 down prohibitive line are exemplified as indicated by alternate long and two short dashes lines respectively. The 6→5 down prohibitive line and the 7→6 down prohibitive line are set higher in the vehicle speed V and smaller in the accelerator depression amount θacc than the 6→5 down line and the 7→6 down line as the normal down lines indicated by the solid lines respectively. On these down prohibitive lines as well as the down lines, it is determined whether to execute a downshift or not according to down prohibitive points.

Besides, in the case where the accelerator depression amount θacc changes as indicated by, for example, a blank arrow A in FIG. 4, a feeling of busy shift is caused when the 7→6 downshift is carried out and then the 6→5 downshift is carried out. It is therefore desirable to execute the 7→5 downshift. That is, it is more desirable to execute a downshift from the current gear stage to the second gear stage than to successively execute a downshift from the current gear stage to the first gear stage that is lower in vehicle speed than the current gear stage and a downshift from the first gear stage to the second gear stage that is lower in vehicle speed than the first gear stage. In the present embodiment of the present disclosure, the first gear stage is a gear stage (hereinafter referred to as a first gear stage Gdn1) that is lower in vehicle speed than the current gear stage by one stage, and the second gear stage is a gear stage (hereinafter referred to as a second gear stage Gdn2) that is lower in vehicle speed than the first gear stage Gdn1 by one stage. Accordingly, each of the downshift from the current gear stage to the first gear stage Gdn1 and the downshift from the first gear stage Gdn1 to the second gear stage Gdn2 is a single downshift, and the downshift from the current gear stage to the second gear stage Gdn2 is a skip downshift. Besides, each of the down lines as indicated by the solid lines in FIG. 4 is a first relationship determined in advance for an interval between those of the plurality of the gear stages which are different from each other by one stage, and each of the down prohibitive lines as indicated by the alternate long and two short dashes lines in FIG. 4 is a second relationship determined in advance such that it is more likely to be determined that a downshift should be carried out than in the first relationship.

By the way, when the accelerator depression amount θacc assumes a state as indicated by, for example, a blank arrow B in FIG. 4 while changing, it is first determined that the downshift to the first gear stage Gdn1 should be carried out. At this moment, it is conceivable to swiftly output a command to execute the single downshift to the first gear stage Gdn1 (hereinafter referred to as a single downshift command), and cancel the single downshift command to the first gear stage Gdn1 and newly output a command to execute the skip downshift to the second gear stage Gdn2 (hereinafter referred to as a skip downshift command) when it is determined that the downshift to the second gear stage Gdn2 should be carried out. In this case, if such a long time that the single downshift command to the first gear stage Gdn1 cannot be canceled elapses, the single downshift command to the second gear stage Gdn2 is output after the single downshift to the first gear stage Gdn1 is carried out. As a result, the single downshifts are successively carried out, which may cause a feeling of busy shift. On the other hand, it is also conceivable to refrain from outputting the single downshift command to the first gear stage Gdn1 for a certain time and postpone the single downshift in expectation of a determination that the downshift to the second gear stage Gdn2 should be carried out, when it is determined that the downshift to the first gear stage Gdn1 should be carried out. In this case, the single downshift is postponed even when the amount of request for acceleration is small, so the re-acceleration performance may be lost. On the other hand, it is also conceivable to positively execute the skip downshift to the second gear stage Gdn2 by determining the down prohibitive lines in advance such that it is more likely to be determined that a downshift should be carried out. In this case, the hysteresis from the up line may become insufficient, and a busy shift, that is, an upshift after the skip downshift may be caused.

Thus, the electronic control unit 60 carries out a single downshift or a skip downshift in consideration of the intention of acceleration and the down lines. In order to realize such a shift mode, the electronic control unit 60 is further equipped with opening degree change rate determination means, namely, an opening degree change rate determination unit 66.

The opening degree change rate determination unit 66 determines whether or not the change rate of the accelerator depression amount θacc (hereinafter referred to as an accelerator depression amount change rate θacc) is larger than a predetermined value. This predetermined value is, for example, a criterial threshold determined in advance to determine that the accelerator depression amount θacc at which it is likely to be determined that the downshift to the second gear stage Gdn2 should be carried out is changing.

The shift control unit 64 swiftly outputs a single downshift command from the current gear stage to the first gear stage Gdn1 if it is not determined that the downshift to the second gear stage Gdn2 should be carried out and the opening degree change rate determination unit 66 determines that the accelerator depression amount change rate dθacc is equal to or smaller than a predetermined value when it is determined that the downshift to the first gear stage Gdn1 should be carried. Accordingly, in the case where the possibility of determining that the downshift to the second gear stage Gdn2 should be carried out is considered to be low as a result of the convergence of the increase in the accelerator depression amount θacc, the single downshift to the first gear stage Gdn1 is swiftly carried out without being postponed. Therefore, good re-acceleration performance is obtained.

On the other hand, the shift control unit 64 maintains the current gear stage if it is not determined that the downshift to the second gear stage Gdn2 should be carried out and the opening degree change rate determination unit 66 determines that the accelerator depression amount change rate dθacc is larger than the predetermined value when it is determined that the downshift to the first gear stage Gdn1 should be carried out. Accordingly, in the case where it may be determined that the downshift to the second gear stage Gdn2 should be carried out as a result of an increase in the accelerator depression amount θacc, the outputting of a single downshift command to the first gear stage Gdn1 is postponed, so the skip downshift to the second gear stage Gdn2 can be carried out when it is determined that the downshift to the second gear stage Gdn2 should be carried out. That is, the outputting itself of the single downshift command to the first gear stage Gdn1 is delayed until the increase in the accelerator depression amount θacc converges. Therefore, a busy shift is restrained from occurring when it is determined that the downshift to the second gear stage Gdn2 should be carried out. From a different point of view, once a single downshift command to the first gear stage Gdn1 is output, the skip downshift to the second gear stage Gdn2 can be carried out only before the lapse of a time that allows the single downshift command to be canceled. In contrast, in the case where it may be determined that the downshift to the second gear stage Gdn2 should be carried out, the outputting itself of the single downshift command to the first gear stage Gdn1 is postponed, so the number of opportunities to make it possible to execute the skip downshift to the second gear stage Gdn2 increases.

The shift control unit 64 outputs a single downshift command from the current gear stage to the first gear stage Gdn1 if the opening degree change rate determination unit 66 determines that the accelerator depression amount change rate dθacc is equal to or smaller than the predetermined value when the current gear stage is maintained. On the other hand, the shift control unit 64 outputs a skip downshift command from the current gear stage to the second gear stage Gdn2 when it is determined that the downshift to the second gear stage Gdn2 should be carried out. After all, better drivability is obtained in the case where a single downshift command to the first gear stage Gdn1 is slightly delayed to maintain the current gear stage and then the single downshift command to the first gear stage Gdn1 or a skip downshift command to the second gear stage Gdn2 is output than in the case where the succession of the single downshifts results from immediately outputting the single downshift command to the first gear stage Gdn1 when it is determined that the downshift to the first gear stage Gdn1 should be carried out. Besides, the skip downshift to the second gear stage Gdn2 is not positively carried out by determining the down prohibitive lines in advance such that it is more likely to be determined that a downshift should be carried out. That is, it is advisable to use the down prohibitive lines with the hysteresis from the up lines appropriately ensured. Therefore, a busy shift, namely, an upshift after the skip downshift is restrained from occurring.

In the case where the accelerator depression amount θacc is increased, the shift control unit 64 determines that the downshift from the current gear stage to the first gear stage Gdn1 should be carried out using the down lines (the first relationship), and determines that the downshift from the current gear stage to the second gear stage Gdn2 should be carried out using the down prohibitive lines (the second relationship). The case where the accelerator depression amount θacc is increased means, for example, a case where the accelerator depression amount θacc is increased by a predetermined opening degree, which is determined in advance to make it possible to determine that the amount of request for acceleration by the driver is large, or more.

Preferably, the shift control unit 64 calculates a criterial vehicle speed Vx1 (see FIG. 4) as a downshift point at the current acceleration opening degree θacc, using the down line at the current gear stage (e.g., the 7→6 down line). Besides, the shift control unit 64 calculates a criterial vehicle speed Vx2 (see FIG. 4) as a down prohibitive point at the current accelerator depression amount θacc, using the down prohibitive line (e.g., the 6→5 down prohibitive line) that is located more at a downshift side than the down line at the current gear stage (e.g., the 7→6 down line) by one stage. The shift control unit 64 determines whether or not the current vehicle speed V is lower than the downshift point (the criterial vehicle speed Vx1). If it is determined that the current vehicle speed V is lower than the downshift point, the shift control unit 64 determines that the downshift from the current gear stage to the first gear stage Gdn1 should be carried out. Besides, the shift control unit 64 determines whether or not the current vehicle speed V is lower than the down prohibitive point (the criterial vehicle speed Vx2) (i.e., whether or not the current vehicle speed V is lower than the down prohibitive point that is located more at the downshift side than the current determination on the downshift to the first gear stage Gdn1 by one stage). If it is determined that the current vehicle speed V is lower than the down prohibitive point, the shift control unit 64 determines that the downshift from the current gear stage to the second gear stage Gdn2 should be carried out.

If it is further determined that the downshift to the second gear stage Gdn2 should be carried out when it is determined that the downshift to the first gear stage Gdn1 should be carried out, the shift control unit 64 outputs a skip downshift command from the current gear stage to the second gear stage Gdn2.

In the case where the accelerator depression amount θacc changes as indicated by, for example, a blank arrow C in FIG. 4, even when the accelerator depression amount θacc is increased to fully open the accelerator after it is determined that the downshift to the first gear stage Gdn1 should be carried out, there is no down prohibitive line for determining that the downshift to the second gear stage Gdn2 should be carried out, at a destination to which the accelerator depression amount θacc increases. Therefore, it cannot be determined that the downshift to the second gear stage Gdn2 should be carried out. In such a case, even when the accelerator depression amount θacc has increased, there is no need to postpone the outputting of a single downshift command to the first gear stage Gdn1. Thus, in the case where it cannot be determined that the downshift to the second gear stage Gdn2 should be carried out even if the accelerator depression amount θacc is maximized when it is determined that the downshift to the first gear stage Gdn1 should be carried out, the shift control unit 64 swiftly outputs a single downshift command from the current gear stage to the first gear stage Gdn1 instead of postponing it.

Preferably, the shift control unit 64 calculates a criterial vehicle speed Vxmax (see FIG. 4) as the down prohibitive point at which the accelerator depression amount θacc is equal to 100(%), using the down prohibitive line (e.g., the 6→5 down prohibitive line) that is located more at the downshift side than the down line (e.g., the 7→6 down line) at the current gear stage by one stage. The shift control unit 64 determines whether or not the current vehicle speed V is lower than the down prohibitive point (the criterial vehicle speed Vxmax) at which the accelerator depression amount θacc is equal to 100(%) (i.e., whether or not the current vehicle speed V is lower than the down prohibitive point calculated with the accelerator depression amount θacc equal to 100(%) using the down prohibitive line that is located more at the downshift side than the current determination on the downshift to the first gear stage Gdn1 by one stage). If it is determined that the current vehicle speed V is equal to or higher than the down prohibitive point (the criterial vehicle speed Vxmax), the shift control unit 64 swiftly outputs a single downshift command from the current gear stage to the first gear stage Gdn1.

In the case where a skip downshift destination from the current gear stage is a gear stage that is not permitted as the skip downshift destination, the skip downshift to the second gear stage Gdn2 cannot be carried out. In such a case, even when the accelerator depression amount θacc has increased, there is no need to postpone the outputting of a single downshift command to the first gear stage Gdn1. Thus, if the second gear stage Gdn2 is a gear stage that is not permitted as a downshift destination from the current gear stage when it is determined that the downshift to the first gear stage Gdn1 should be carried out, the shift control unit 64 swiftly outputs a single downshift command from the current gear stage to the first gear stage Gdn1.

Preferably, the gear stage that is not permitted as a skip downshift destination is, for example, a relatively low vehicle speed-side gear stage. That is, a skip downshift is carried out at a relatively high vehicle speed-side gear stage. Therefore, a lower-limit gear stage, which is the lowest vehicle speed-side gear stage among the relatively high vehicle speed-side gear stages that are permitted as skip downshift destinations, is determined in advance. The shift control unit 64 determines whether or not the second gear stage Gdn2, which is located more at the downshift side than the current determination on the downshift to the first gear stage Gdn1 by one stage, is a high vehicle speed-side gear stage that is equal to or higher than the lower-limit gear stage of the skip downshift. If it is determined that the second gear stage Gdn2 is a low vehicle speed-side gear stage that is lower than the lower-limit gear stage, the shift control unit 64 swiftly outputs a single downshift command from the current gear stage to the first gear stage Gdn1.

FIG. 5 is a flowchart illustrating the essential part of a control operation of the electronic control unit 60, namely, a control operation for restraining a feeling of busy shift from being caused due to the succession of downshifts in two stages. This flowchart is repeatedly executed during the running of the vehicle 10, for example, when the automatic transmission 22 is at a high vehicle speed-side gear stage that is equal to or higher than the second-speed gear stage.

In FIG. 5, in step (the word "step" will be omitted hereinafter) S10 corresponding to the function of the shift control unit 64, a downshift point at the current accelerator depression amount θacc (the criterial vehicle speed Vx1) is calculated using the down line at the current gear stage. Subsequently, in S20 corresponding to the function of the shift control unit 64, a down prohibitive point at the current accelerator depression amount accelerator depression amount θacc (the criterial vehicle speed Vx2) is calculated using the down prohibitive line that is located more at the downshift side than the down line at the current gear stage by one stage. Subsequently, in S30 corresponding to the function of the shift control unit 64, it is determined whether or not the current vehicle speed V is lower than the downshift point (the criterial vehicle speed Vx1). If the result of the determination in this S30 is negative, the present routine is ended. If the result of the determination in this S30 is positive, it is determined, in S40 corresponding to the function of the shift control unit 64, whether or not the second gear stage Gdn2, which is located more at the downshift side than the current determination on the downshift to the first gear stage Gdn1 due to the positive result of the determination in the S30 by one stage, is a high vehicle speed-side gear stage that is equal to or higher than the lower-limit gear stage of a skip downshift. If the result of the determination in this S40 is positive, it is determined, in S50 corresponding to the function of the shift control unit 64, whether or not the current vehicle speed V is lower than the down prohibitive point (the criterial vehicle speed Vxmax) calculated with the accelerator depression amount θacc equal to 100(%) using the down prohibitive line that is located more at the downshift side than the current determination on the downshift to the first gear stage Gdn1 due to the positive result of the determination in the S30 by one stage. If the result of the determination in this S50 is positive, it is determined, in S60 corresponding to the function of the shift control unit 64, whether or not the current vehicle speed V is lower than the down prohibitive point (the criterial vehicle speed Vx2) that is located more at the downshift side than the current determination on the downshift to the first gear stage Gdn1 due to the positive result of the determination in the S30 by one stage. If the result of the determination in this S60 is negative, it is determined, in S70 corresponding to the function of the opening degree change rate determination unit 66, whether or not the accelerator depression amount change rate dθacc is larger than a predetermined value. If the result of the determination in the aforementioned S40 is negative, or if the result of the determination in the aforementioned S50 is negative, or if the result of the determination in the aforementioned S70 is negative, a single downshift command from the current gear stage to the first gear stage Gdn1 is output, and a normal downshift as a single downshift from the current gear stage (the Nth speed) to the gear stage (N−1) that is lower in vehicle speed than the current gear stage by one stage is carried out, in S80 corresponding to the function of the shift control unit 64. On the other hand, if the result of the determination in the aforementioned S70 is positive, the current gear stage (the Nth speed) is maintained in S90 corresponding to the function of the shift control unit 64. On the other hand, if the result of the determination in the aforementioned S60 is positive, a skip downshift command from the current gear stage to the second gear stage Gdn2 is output, and a skip downshift from the current gear stage (the Nth speed) to the gear stage that is lower in vehicle speed than the current gear stage by two stages is carried out, in S100 corresponding to the function of the shift control unit 64.

As described above, according to the present embodiment of the present disclosure, if it is not determined that the downshift to the second gear stage Gdn2 should be carried out and the accelerator depression amount change rate dθacc is equal to or smaller than the predetermined value when it is determined that the downshift to the first gear stage Gdn1 should be carried out, a single downshift command from the current gear stage to the first gear stage Gdn1 is output. Therefore, when the possibility of determining that the downshift to the second gear stage Gdn2 should be carried out is low, the downshift to the first gear stage Gdn1 is swiftly carried out. On the other hand, if it is not determined that the downshift to the second gear stage Gdn2 should be carried out and the accelerator depression amount change rate dθacc is larger than the predetermined value when it is determined that the downshift to the first gear stage Gdn1 should be carried out, the current gear stage is maintained. Therefore, in the case where the possibility of determining that the downshift to the second gear stage Gdn2 should be carried out is high, when it is determined that the downshift to the second gear stage Gdn2 should be carried out, the downshift to the first gear stage Gdn1 is not carried out, and the skip downshift from the current gear stage to the second gear stage can be carried out. In consequence, a feeling of busy shift can be restrained from being caused due to the succession of downshifts in two stages.

Besides, according to the present embodiment of the present disclosure, if the accelerator depression amount change rate dθacc is equal to or smaller than the predetermined value when the current gear stage is maintained, a single downshift command to the first gear stage Gdn1 is output. On the other hand, if it is determined that the downshift to the second gear stage Gdn2 should be carried out, a skip downshift command to the second gear stage Gdn2 is output. Therefore, better drivability results from slightly delaying the downshift to the first gear stage Gdn1 to maintain the current gear stage and then outputting a single downshift command to the first gear stage Gdn1 or comprehensively outputting a skip downshift command to the second gear stage Gdn2.

Besides, according to the present embodiment of the present disclosure, if it is further determined that the downshift to the second gear stage Gdn2 should be carried out when it is determined that the downshift to the first gear stage Gdn1 should be carried out, a skip downshift command to the second gear stage Gdn2 is output. Therefore, the downshift to the second gear stage Gdn2 is carried out from the current gear stage without the intermediary of the first gear stage Gdn1.

Besides, according to the present embodiment of the present disclosure, in the case where it cannot be determined that the downshift to the second gear stage Gdn2 should be carried out even if the accelerator depression amount θacc is maximized when it is determined that the downshift to the first gear stage Gdn1 should be carried out, a single downshift command to the first gear stage Gdn1 is swiftly output. Therefore, if it cannot be determined that the downshift to the second gear stage Gdn2 should be carried out even when the downshift to the first gear stage Gdn1 is delayed, the downshift to the first gear stage Gdn1 is swiftly carried out.

Besides, according to the present embodiment of the present disclosure, if the second gear stage Gdn2 is a gear stage that is not permitted as a downshift destination from the current gear stage when it is determined that the downshift to the first gear stage Gdn1 should be carried out, a single downshift command to the first gear stage Gdn1 is swiftly output. Therefore, if the downshift to the second gear stage Gdn2 cannot be carried out even when the downshift to the first gear stage Gdn1 is delayed, the downshift to the first gear stage Gdn1 is swiftly carried out.

Besides, according to the present embodiment of the present disclosure, when the accelerator depression amount θacc is increased, it is determined that the downshift to the first gear stage Gdn1 should be carried out using the first relationship (the down line), and it is determined that the downshift to the second gear stage Gdn2 should be carried out using the second relationship (the down prohibitive line) in which it is more likely to be determined that a downshift should be carried out than in the first relationship. Therefore, when the accelerator depression amount θacc is increased, the downshift to the second gear stage Gdn2 is likely to be carried out from the current gear stage without the intermediary of the first gear stage Gdn1.

Although the embodiment of the present disclosure has been described above in detail based on the drawings, the present disclosure is also applicable to other aspects thereof.

For example, in the foregoing embodiment of the present disclosure, the gear stage that is not permitted as a skip downshift destination is a relatively low vehicle speed-side gear stage (i.e., a low vehicle speed-side gear stage that is lower than the lower-limit gear stage), but the present disclosure is not limited to this aspect thereof. For example, the gear stage that is not permitted may be a specific gear stage to which it is inconvenient to execute a downshift from the current gear stage in shift control, or a gear stage at which the engine rotational speed Ne is excessive. Alternatively, all the gear stages may be permitted except the gear stage(s) at which the engine rotational speed Ne is excessive. In this case, if there is a premise that a downshift to a gear stage at which the engine rotational speed Ne is excessive is originally prohibited, S40 in the flowchart of FIG. 5 is not provided. As described hitherto, the flowchart of FIG. 5 can be changed as appropriate.

Besides, in the foregoing embodiment of the present disclosure, the first gear stage that is lower in vehicle speed than the current gear stage is the gear stage (the first gear stage Gdn1) that is lower in vehicle speed than the current gear stage by one stage, and the second gear stage that is lower in vehicle speed than the first gear stage is the gear stage (the second gear stage Gdn2) that is lower in vehicle speed than the first gear stage Gdn1 by one stage, but the present disclosure is not limited to this aspect thereof. For example, the first gear stage may be a gear stage that is lower in vehicle speed than the current gear stage by two or more stages, and the second gear stage may be a gear stage that is lower in vehicle speed than the first gear stage by two or more stages.

Besides, in the foregoing embodiment of the present disclosure, the respective gear stages, that is, the eight forward stages are formed in the automatic transmission 22, but the present disclosure is not limited to this aspect thereof. For example, the automatic transmission 22 may be a planetary gear-type multistage transmission in which a plurality of gear stages having different gear ratios are established through selective engagement of at least one of a plurality of engagement devices. Alternatively, the automatic transmission 22 may be, for example, a known synchronous mesh-type parallel dual-shaft transmission that is equipped with a plurality of pairs of shift gears constantly meshing with one another between two shafts and that allows a changeover in gear stage to be automatically made through the control of engagement and release of dog clutches (i.e., meshing clutches) by actuators, or a known synchronous mesh-type parallel dual-shaft automatic transmission that is equipped with two input shafts, such as a known dual clutch transmission (a known DCT) or the like. In short, the automatic transmission 22 is only required to be an automatic transmission in which a plurality of gear stages having different gear ratios are selectively formed.

Besides, in the foregoing embodiment of the present disclosure, the engine 12 is exemplified as the driving force source of the vehicle 10, but the present disclosure is not limited to this aspect thereof. For example, another prime mover such as an electric motor or the like alone or a combination of this prime mover with the engine 12 can also be adopted as the driving force source. Besides, the motive power of the engine 12 is transmitted to the automatic transmission 22 via the torque converter 20, but the present disclosure is not limited to this aspect thereof. For example, another hydraulic transmission device such as a fluid coupling with no torque amplification effect or the like may be employed instead of the torque converter 20. Alternatively, this hydraulic transmission device is not absolutely required to be provided.

Incidentally, the foregoing is nothing more than the embodiment of the present disclosure. The present disclosure can be carried out in aspects subjected to various alterations and improvements based on the knowledge of those skilled in the art.

What is claimed is:

1. A control apparatus for a vehicle, the vehicle being equipped with an automatic transmission in which a plurality of gear stages having different gear ratios are selectively provided, the control apparatus comprising:
    an electronic control unit configured to:
        (i) determine whether or not a change rate of an accelerator depression amount of the vehicle is larger than a predetermined value;
        (ii) output a command to execute a downshift from a current gear stage to a first gear stage when both
            a condition of a downshift to a second gear stage is not fulfilled, the second gear stage being lower in vehicle speed than the first gear stage, and
            the electronic control unit determines that the change rate of the accelerator depression amount is equal to or smaller than the predetermined value when a condition of the downshift to the first gear stage is fulfilled, the first gear stage being lower in vehicle speed than the current gear stage, and
        (iii) maintain the current gear stage when the condition of the downshift to the second gear stage is not fulfilled and when the electronic control unit determines that the change rate of the accelerator depression amount is larger than the predetermined value.

2. The control apparatus for the vehicle according to claim 1, wherein when the current gear stage is maintained, the electronic control unit is configured to: (i) output a command to execute the downshift from the current gear stage to the first gear stage when the electronic control unit determines that the change rate of the accelerator depression amount is equal to or smaller than the predetermined value, and (ii) output a command to execute the downshift from the current gear stage to the second gear stage when the condition of the downshift to the second gear stage is fulfilled.

3. The control apparatus for the vehicle according to claim 1, wherein the electronic control unit is configured to output a command to execute the downshift from the current gear stage to the second gear stage when the condition of the downshift to the second gear stage is further fulfilled when the condition of the downshift to the first gear stage is fulfilled.

4. The control apparatus for the vehicle according to claim 1, wherein the electronic control unit is configured to output a command to execute the downshift from the current gear stage to the first gear stage when the condition of the downshift to the second gear stage cannot be fulfilled even though the accelerator depression amount is maximized when the condition of the downshift to the first gear stage is fulfilled.

5. The control apparatus for the vehicle according to claim 1, wherein the electronic control unit is configured to output a command to execute the downshift from the current gear stage to the first gear stage when the second gear stage is a gear stage that is not permitted as a downshift destination from the current gear stage when the condition of the downshift to the first gear stage is fulfilled.

6. The control apparatus for the vehicle according to claim 1, wherein when the accelerator depression amount is increased, the electronic control unit is configured to: (i) determine whether or not the condition of the downshift to the first gear stage is fulfilled, by using a first relationship determined in advance for each interval between the plurality of the gear stages which are different from each other by one stage, and (ii) determine whether or not the condition of the downshift to the second gear stage is fulfilled, by using a second relationship determined in advance such that the condition of the downshift is more likely to be fulfilled than in the first relationship.

* * * * *